UNITED STATES PATENT OFFICE.

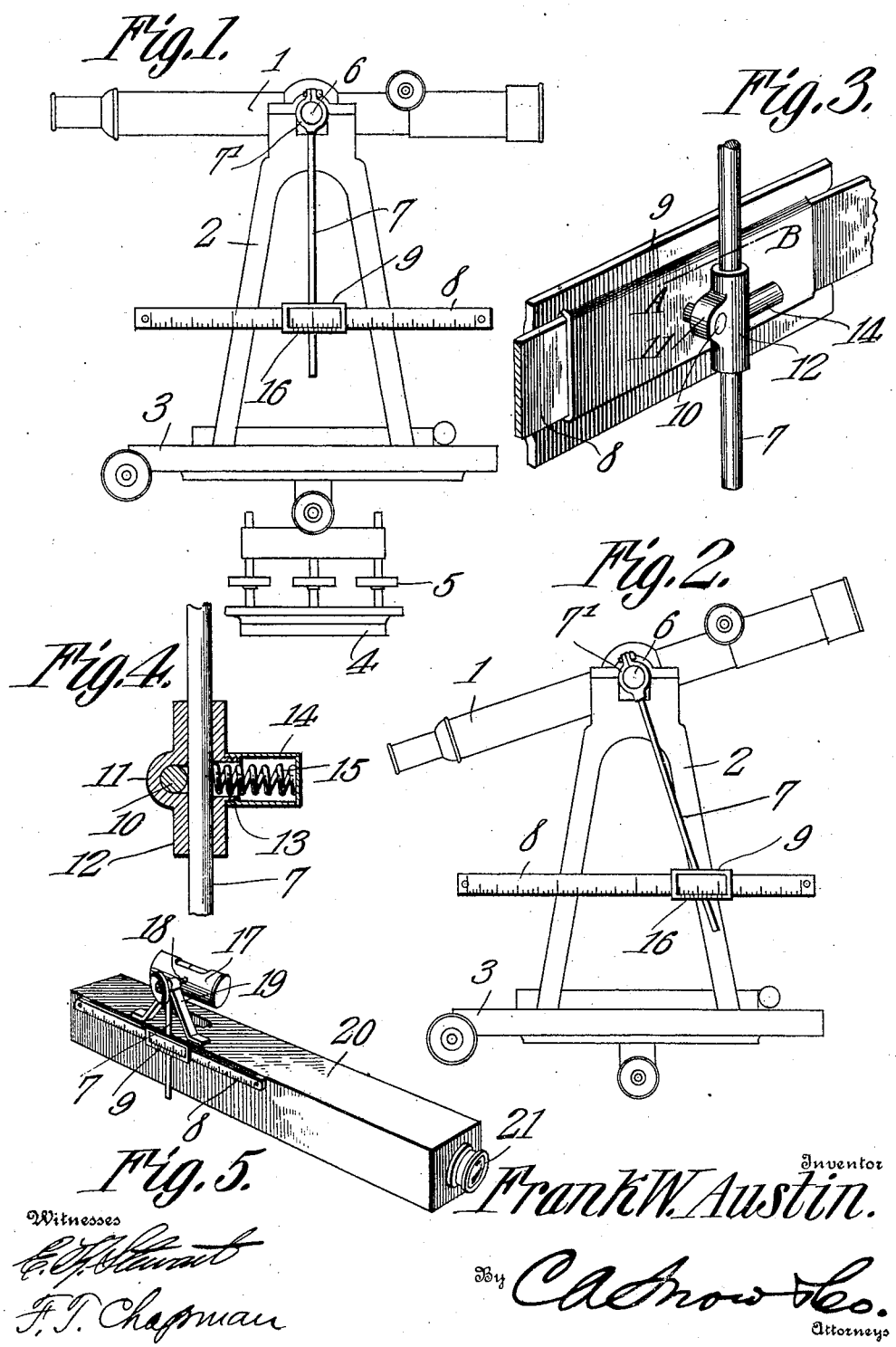

FRANK W. AUSTIN, OF CABOOL, MISSOURI.

ATTACHMENT FOR ENGINEERS' TRANSITS AND HAND-LEVELS.

No. 925,674.  Specification of Letters Patent.  Patented June 22, 1909.

Application filed October 31, 1908. Serial No. 460,488.

*To all whom it may concern:*

Be it known that I, FRANK W. AUSTIN, a citizen of the United States, residing at Cabool, in the county of Texas and State of Missouri, have invented a new and useful Attachment for Engineers' Transits and Hand-Levels, of which the following is a specification.

This invention has reference to improvements in attachments for engineers' transits and hand levels and its object is to provide for the direct reading of percentages of grade.

Heretofore two means have been provided for the reading of grade percentages. One means is by the gradienter, but such instrument is time consuming and need not be further considered. The other method of determining the percentage of grade is to ascertain the degree of the grade from the vertical arc attached to the transit and then by reference to the pocket field book ascertain the percentage of grade.

By the present invention it is possible to read the percentage of grade directly and to read it to the finest division by means of a suitable vernier.

The invention without modification may be applied to a hand level, thus replacing the Abney hand level or the Locke level.

The present invention may be employed on transits for reconnaissance, preliminary and location surveys, or any other surveys which are made for the purpose of establishing or testing grades.

The invention will be best understood from a consideration of the following detail description taken in connection with the accompanying drawings forming a part of this specification, in which drawings, Figure 1 is a side elevation of a transit with the invention applied thereto, the transit telescope being shown in the neutral or zero position. Fig. 2 is a similar view showing the telescope tilted for ascertaining or testing a grade. Fig. 3 is a perspective view of the rear portion of the slide shown on a larger scale than in Figs. 1 and 2. Fig. 4 is a vertical section on the line A—B of Fig. 3, with parts shown in elevation. Fig. 5 is a perspective view of the attachment as applied to a level of the pocket or hand type.

Referring to the drawings there is shown a telescope 1 of an ordinary transit mounted upon pedestals 2 rising from the compass platform or support 3 which in turn is supported by the tripod head 4 through leveling screws 5, all these parts being common to an ordinary transit and typical of any kind of transit.

Made fast at one end to one of the trunnions 6 of the telescope 1 is a rod 7, preferably though not necessarily round in cross section. Suitably secured to the pedestals 2 on the same side as the rod 7 is a scale bar 8 parallel with the compass platform or support 3 and with the telescope 1 when the latter is in the horizontal position. The scale upon the bar 8 has a central zero position and the scale indications extend in either direction from the zero position to the highest percentage for which the scale is made, and these indications are all equi-distantly disposed.

Mounted upon the bar 8 so as to slide longitudinally thereof is a frame 9 which may be of open construction on the scale side of the bar 8 and may or may not be of closed construction on the rear side of said bar. The construction of this frame 9 may be that shown in Fig. 3 but it is to be understood that any suitable construction of frame may be used and the showing of Fig. 3 is to be taken simply as illustrative.

Extending rearwardly from the back of the frame 9 at a point about the middle thereof is a stud or pin 10 extending through an ear 11 formed on one side of a sleeve 12, the opening in the ear 11 for the reception of the pin 10 merging into the central passage through the sleeve 12. On the side of the sleeve 12 opposite the ear 11 there is formed a neck 13 having a central opening extending into the passage through the sleeve 12 and this neck 13 receives a cap 14 which may be screwed thereon and which cap houses a spring 15, shown as a helical spring and having one end engaging the rod 7 which extends through the passage in the sleeve 12. That side of the frame 9 which is adjacent to the scale on the bar 8 is provided with another scale constituting a vernier scale as indicated at 16.

With a transit so equipped let it be assumed that the instrument has been properly leveled and then the telescope is sighted on a target properly elevated at a suitably distant point on the slope the percentage of grade of which it is desired to ascertain. The movement of the telescope 1 about the axis of its trunnions has caused a movement of the frame 9 along the scale bar 8 commensurate with the inclination of the telescope out of parallelism with the compass platform or support 3, the rod 7 having moved through the sleeve 12 because of the change in distance between the frame 9 and the axis of the telescope trunnions due to the movement of the frame 9 on the bar 8. The direct reading of the scale on the bar 8 will give the percentage of inclination or grade without the necessity of referring to any tables in books or elsewhere. The scale on the bar 8 may be made to read in units of percentage while the vernier scale will enable the reading of fractions of units of percentage.

The pressure of the spring 15 on the rod 7 is sufficient to hold the latter always in engagement with the pin 10 thus avoiding lost motion or backlash. The rod 7 is secured to the trunnion 6 by means of a clamp 7' so that the rod 7 may be uncoupled from the trunnion and the telescope may then be moved to any desired extent without actuating the rod 7, as will often be necessary in the ordinary use of the transit.

In Fig. 5 the application of the invention to the hand or pocket level is indicated. In this figure the level tube is shown at 17 mounted on a pivot pin 18 journaled in a bracket 19 fast on the body 20 of the level, the latter having an eye piece 21 at one end thereof as is common in levels of this character. In the structure shown in Fig. 5 the bar 8 is attached directly to the body 20 and the rod 7 is attached to the pivot pin 18 while the slide or frame 9 is the same as shown in Figs. 1 and 2. The operation of the invention as applied to the level of Fig. 5 is the same as when applied to the transit of Figs. 1 and 2, and therefore need not be repeated.

What is claimed is:—

1. An attachment for surveying instruments having a pivoted member, comprising a rod connected to the pivoted member and a straight bar graduated to percentages of grade and in operative relation to which the rod is movable.

2. A grade percentage indicator for surveying instruments, having a straight index scale with equi-distantly disposed percentage index markings, and a movable member attachable to and movable about the axis of a pivoted member of the surveying instrument and in operative relation to the index markings on the straight scale.

3. A grade percentage indicator for surveying instruments, comprising a straight scale bar having equi-distantly disposed percentage index markings, a sliding member on the bar having a vernier scale thereon, and a rod or bar attachable to and movable about the axis of a pivoted member of the surveying instrument and connected to and actuating the sliding member on the scale bar.

4. A grade percentage indicator for surveying instruments comprising a straight scale bar having equidistantly disposed percentage index markings, a sliding member on the bar having a vernier scale thereon, a rod or bar attachable to and movable about the axis of a pivoted member of the surveying instrument and actuating the sliding member on the scale bar, and means for connecting the rod and sliding member and permitting movement of one relative to the other.

5. A grade percentage indicator for surveying instruments, comprising a straight scale bar having equidistantly disposed percentage index markings, a sliding member on the bar having a vernier scale thereon, a rod or bar attachable to and moving about the axis of a pivoted member of the surveying instrument, and actuating the sliding member on the scale bar, means for connecting the rod and sliding member and permitting movement of one relative to the other, and means for yieldingly clamping the rod and sliding member together.

6. A grade percentage indicator for surveying instruments, comprising a straight scale bar having equi-distantly disposed percentage index markings, a sliding member on the bar having a vernier scale thereon, a rod or bar attachable to and movable about the axis of a pivoted member of the surveying instrument and actuating the sliding member on the scale bar, a pivoted sleeve on the sliding member and through which sleeve the rod is slidable, and a yielding gripping member carried by the sleeve and engaging said rod.

7. A grade percentage indicator for surveying instruments comprising a straight scale bar having equi-distantly disposed percentage index markings, a sliding member on the bar, a rod or bar attachable to and movable about the axis of a pivoted member of the surveying instrument and actuating the sliding member on the scale bar, and a pivotal connection between the rod and sliding member through which connection the rod is also slidable.

8. A grade percentage indicator for surveying instruments comprising a straight scale bar having equidistantly disposed percentage index markings, a sliding member on the bar having a vernier scale thereon in operative relation to the index markings on the bar, a rod attachable to and movable about the axis of a pivoted member of the surveying instrument and actuating the sliding member on the scale bar, and a pivotal connection between the rod and sliding member through which connection the rod is also slidable.

In testimony that I claim the foregoing as my own, I have hereto affixed my signature in the presence of two witnesses.

FRANK W. AUSTIN.

Witnesses:
WILLIAM R. CLIFTON,
CHARLES C. SCHLICHT.